United States Patent [19]

Ikeda et al.

[11] Patent Number: 5,138,502
[45] Date of Patent: Aug. 11, 1992

[54] TAPE COUNTER FOR A ROTARY HEAD TYPE VIDEO SIGNAL RECORDING AND REPRODUCING APPARATUS AND TAPE COUNTING METHOD THEREFOR

[75] Inventors: Tamon Ikeda; Yosuke Otsu; Kikuo Yamamoto, all of Tokyo, Japan

[73] Assignee: Sony Corporation, Japan

[21] Appl. No.: 619,673

[22] Filed: Nov. 29, 1990

Related U.S. Application Data

[63] Continuation of Ser. No. 25,194, Mar. 12, 1987, abandoned.

[30] Foreign Application Priority Data

Mar. 31, 1986 [JP] Japan .................................. 61-74060

[51] Int. Cl.⁵ .............................................. H04N 5/93
[52] U.S. Cl. .................................................... 360/33.1
[58] Field of Search ..................... 360/331, 137, 72.1, 360/72.3, 73.04

[56] References Cited

U.S. PATENT DOCUMENTS

| | | | |
|---|---|---|---|
| 4,398,279 | 8/1983 | Titus, IV et al. | 360/137 X |
| 4,463,390 | 7/1984 | Koga et al. | 360/73 X |
| 4,471,391 | 9/1984 | Reagan | 360/137 X |
| 4,485,337 | 11/1984 | Sandusky | 360/73 X |
| 4,520,406 | 5/1985 | Suzuki et al. | 360/14.2 |
| 4,630,137 | 12/1986 | Sekiguchi | 360/72.1 X |
| 4,713,715 | 12/1987 | Abe | 360/137 |
| 4,717,969 | 1/1988 | Miyake | 360/73 X |
| 4,811,130 | 3/1989 | Takayama | 360/73.11 |

FOREIGN PATENT DOCUMENTS

| | | | |
|---|---|---|---|
| 0205181 | 12/1986 | European Pat. Off. | 360/27 |
| 56-58184 | 5/1981 | Japan | 360/73 |
| 57-138073 | 8/1982 | Japan | 360/73 |
| 58-85983 | 5/1983 | Japan | 360/72.3 |
| 60-147971 | 8/1985 | Japan | 360/73 |
| 61-248279 | 11/1986 | Japan | 360/27 |

*Primary Examiner*—Donald McElheny, Jr.
*Attorney, Agent, or Firm*—Ronald P. Kananen

[57] ABSTRACT

A tape counter for counting an amount of tape by which a tape has run for a video signal recording and reproducing apparatus and method therefor, in which the number of frames on tape tracks over which each rotary head scans are counted according to a change in level of an envelope of a reproduced FM signal detected through each rotary head, the number of rotations of a rotary drum on which the rotary head is mounted is counted, and the amount of tape by which the tape has run is counted on the basis of the number of frames scanned by the rotary head and the number of rotations of the drum. The tape counter detects the amount of tape by which the tape has run in all running modes during a reproduction operation with a high accuracy and displays the amount of tape by which the tape has run in a series of units of hours, minutes, and seconds.

15 Claims, 3 Drawing Sheets

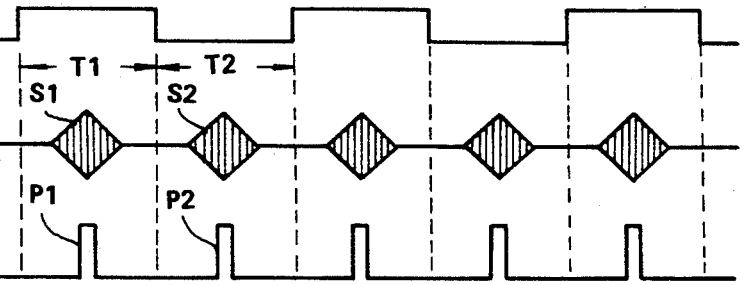
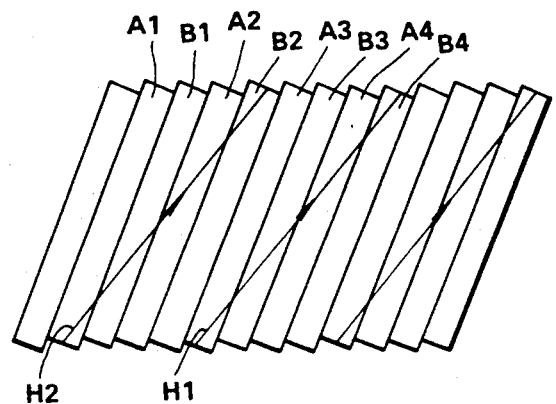
FIG.4
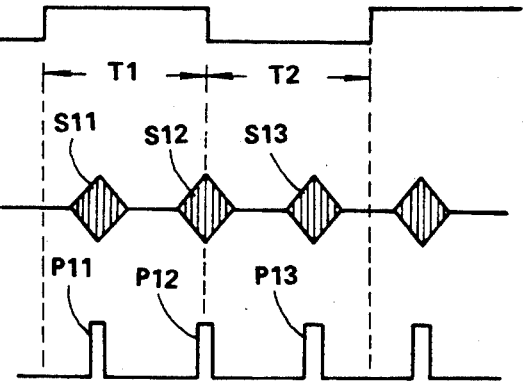

FIG.6
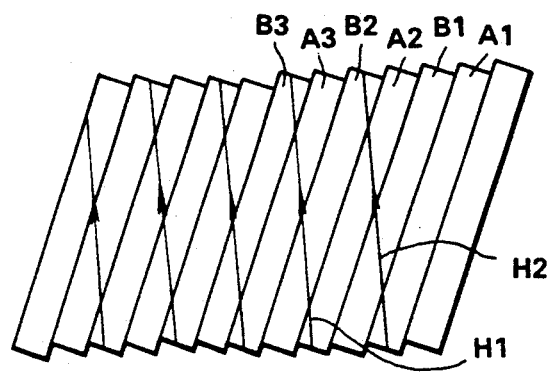
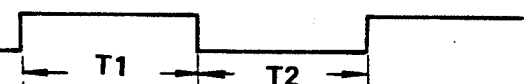
FIG.7(A)
FIG.7(B)
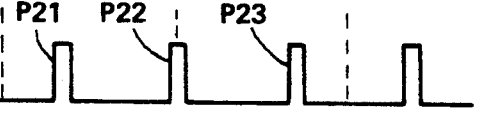
FIG.7(C)

TAPE COUNTER FOR A ROTARY HEAD TYPE VIDEO SIGNAL RECORDING AND REPRODUCING APPARATUS AND TAPE COUNTING METHOD THEREFOR

This application is a continuation of application Ser. No. 07/025,194 filed on Mar. 12, 1987, now abandoned.

BACKGROUND OF THE INVENTION

The present invention relates to a tape counter for a rotary head type video signal recording and reproducing apparatus which counts and displays an amount of a tape by which the tape has run and a tape counting method therefor.

In a rotary head type video signal recording/reproducing apparatus (hereinafter simply referred to as VTR), to measure an amount of tape by which the tape has run during its use, a number of control signals is counted which have been recorded on the tape for each frame period along the lengthwise direction of the tape. The count value is converted on a time base and is displayed in a series of units of hours, minutes, and seconds.

Recently, 8-mm VTRs which use tapes having an 8 mm width have been put into practice. Each of four pilot signals($f_1$ to $f_4$) having mutually different frequencies has sequentially been recorded on each tape track in the 8-mm VTR. In addition, 8-mm VTRs have adopted an ATF (Automatic Tracking Finding) method by means of which the pilot signals are used to perform an accurate tracking operation.

Since the above-described control signals are not recorded on the tape tracks if the ATF method is adopted in such 8-mm VTRs, the tape counter utilizing the presence of control signals described above cannot be used any more in the 8-mm VTR. Hence, a light reflecting board is installed on a reel bed of the 8-mm VTR and, the number of rotations of the reel bed is optically detected through the use of the light reflecting board. The amount of tape by which the tape has run is displayed, e.g., in a four-digit numerical representation.

In such 8-mm VTRs, the number of rotations of the reel bed is detected and the amount of tape by which the tape has run is displayed on the basis of the number of rotations of the reel bed. However, since the amount of tape by which the tape had run per revolution of the reel bed is different depending on a wrap diameter of the tape on the reel bed, an accurate display of the amount by which the tape has run cannot be achieved.

SUMMARY OF THE INVENTION

It is an object of the present invention to provide a tape counter for a rotary head type video signal recording and reproducing apparatus and tape counting method therefor which are capable of accurately counting and displaying the amount of tape by which the tape has run in a series-of units of hours, minutes and seconds without provision of control signals on the tape.

The above-described object can be achieved by providing a tape counter for counting an amount of tape by which a tape has run for a video signal recording and reproducing apparatus, comprising: (a) an envelope detector for detecting and producing an envelope of a reproduced Frequency Modulated (FM) signal derived from at least one rotary head mounted on a rotary drum of the video signal recording and reproducing apparatus; (b) a pulse signal generator for generating a pulse signal according to a change in a level of the envelope produced by the envelope detector; (c) first means for counting the number of rotations per time of the rotary head on the basis of an RF switching signal derived by the video signal recording and reproducing apparatus; and (d) second means for correcting a count value derived by the first means or the basis of the pulse signal generated by the pulse signal generator according to a tape speed in a playback mode with respect to a normal tape speed so that the amount of tape by which the tape has run is counted.

The above-described object can be achieved by providing a method for counting an amount of tape by which a tape has run for a video signal recording and reproducing apparatus, comprising: (a) producing an envelope signal of a reproduced Frequency-Modulated (FM) modulation signal derived from at least one rotary head mounted on a rotary drum of the video signal recording and reproducing apparatus; (t) generating a pulse signal according to a change in a level of the envelope signal produced in the step (a); (c) counting the number of rotations per time of the rotary head; (d) correcting a count value derived in the step (c) on the basis of the pulse signal generated in the step (b) according to a tape speed in a playback mode with respect to a normal tape speed so that the amount of tape by which the tape has run is counted.

BRIEF DESCRIPTION OF THE DRAWINGS

A more complete understanding of the present invention may be obtained from the following detailed description taken in conjunction with the attached drawings in which:

FIGS. 3(A) through 3(C) are timing charts of pulses derived by the scanning of rotary heads over the tape tracks during the reproduction of the tape at the speed three times faster than the normal tape speed;

FIG. 4 is an explanatory view of tape tracks over which rotary heads scan during the reproduction of the tape at a speed four times faster than the normal tape speed;

FIGS. 5(A) through 5(C) are timing charts of pulses derived by the scanning of rotary heads over the tape tracks during the reproduction of the tape at the speed four times faster than the normal tape speed;

FIG. 6 is an exploratory view of tape tracks over which rotary heads scan during the reproduction of the tape at the speed three times faster than the normal tape speed in a direction opposite to the normal tape running direction; and FIGS. 7(A) through 7(C) are timing charts of pulses derived by the scanning of the rotary heads over the tape tracks during the reproduction of the tape at the speed three times faster than the normal tape speed in the opposite direction to the normal tape running direction.

DETAILED DESCRIPTION OF THE PREFERRED EMBODIMENT

Reference will hereinafter be made to the drawings in order to facilitate an understanding of the present invention.

Figure 1:
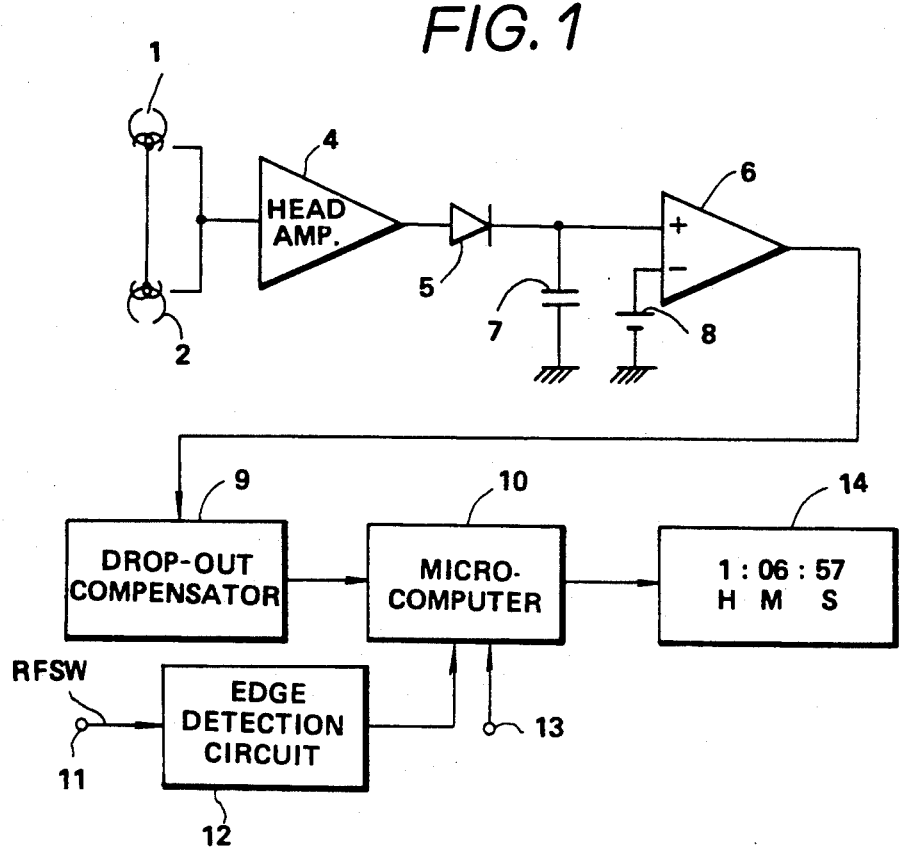
FIG. 1 is a circuit block diagram of a preferred embodiment of a tape counter for a video signal recording and reproducing apparatus according to the present invention.

FIG. 1 shows a preferred embodiment of a tape counter for a video signal recording and reproducing apparatus according to the present invention.

In FIG. 1, a pair of rotary heads 1 and 2 are mounted on a rotary drum (not shown) with an angular interval of 180 degrees between the two rotary heads 1 and 2. The rotary drum is usually rotated at 30 rotations per second (which is synchronized with a field frequency). A magnetic tape is wound obliquely on the rotary drum through a wrap angle wider greater than 180 degrees. The rotary heads 1 and 2 rotate at a predetermined speed. Extended directions of gaps provided within the rotary heads 1 and 2 are made different so that oblique azimuth recording is carried out. Output signals of the rotary heads 1 and 2 are supplied to a rotary transformer and switcher (not shown) to form a one-channel reproduced signal. The reproduced signal is amplified by means of a head amplifier 4. The output signal of the head amplifier 4 is supplied to an envelope detector including a diode 5 and a capacitor 7. The output signal of the envelope detector is supplied to one input terminal of a level comparator 6. A DC power supply 8 (reference voltage) is supplied to the other input terminal of the level comparator 6.

When the output signal level of the envelope detector exceeds a predetermined level, the level comparator 6 produces one pulse signal. The output pulse signal of the level comparator 6 is supplied to a drop-out compensator 9. The drop-out compensator 9 compensates a required position for a pulse signal when the pulse signal is not produced at the required position of time from the level comparator 6 at an equal interval. A pulse train as the output signal of the drop-out compensator 9 is supplied to a microcomputer 10 for calculating the amount of tape through which the tape has run.

In addition, an RF switching signal having a period corresponding to one rotation of the drum (refer to FIG. 3A) received via an input terminal 11 from an RF switching signal generator of the VTR is inputted to an edge detector 12. The edge detector 12 detects a rising edge (or falling edge) of the RF switching signal. A rotation pulse signal is produced whenever the rotary drum makes one rotation on which the rotary heads 1 and 2 are mounted. The rotation pulse signal is supplied to the microcomputer 10. Furthermore, a mode signal such as a playback mode, fast forward mode, and so on is transmitted to the microcomputer 10 via a mode signal input terminal 13. The microcomputer 10 usually includes a CPU (Central Processing Unit), ROM (Read Only Memory), RAM (Random Access Memory), and I/O interface. The microcomputer 10 determines from the contents of the mode signal whether a tape speed at the time of reproduction is faster or slower than that at the time of a normal reproduction, that is to say, a tape speed equal to that at the time of recording. The microcomputer 10 calculates the amount of tape which has run. The contents of the display are expressed in series of units, i.e., hours, minutes, and seconds in a display unit 14 and are thus varied according to the calculated running of tape.

The detection and display of the amount of tape run amount in the preferred embodiment will be described with reference to FIGS. 2 and 3 when the tape speed of the VTR is three times faster than the normal tape speed.

Figure 2:
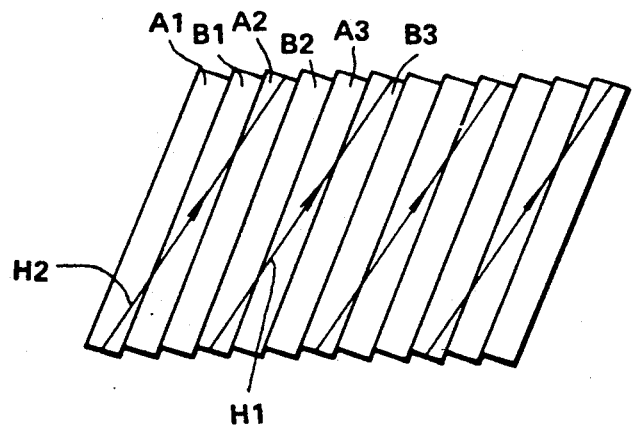
FIG. 2 is an exploratory view of tape tracks over which a rotary head scars during the reproduction of a tape at a speed three times faster than the normal tape speed.

As shown in FIG. 2, a track A1, track A2, track A3, track A4, ... and a track B1, track B2, track B3, track B4, ... are alternately arranged on the tape. The tracks A1, A2, A3, ... are recorded with an A azimuth. The tracks B1, B2, B3 ... are recorded with a B azimuth. The rotary heads 1 and 2 are obliquely in contact with the tape. For example, when the rotary drum has rotated through a half cycle during an interval T1, the rotary head 2 scans track A1, track B1, and track A2 to draw a scanning locus H2. In addition, during the interval of the subsequent half rotation T2 of the rotary drum, the rotary head 1 scans track B2, track A3, and track B3 to draw the scanning locus H1.

During the period T1 of the RF switching signal shown in FIG. 3(A), the rotary head 2 scans the track B1. At the beginning of this time, both azimuths of the rotary head 2 and track B1 are matched with each other. An RF signal S1 having a predetermined level is simultaneously produced. The diode 5 of the envelope detector produces the envelope signal of the RF signal S1. When the level of the envelope signal exceeds the signal reference level, a pulse P1 is produced as the output signal of the level comparator 6 as shown in FIG. 3(C). In addition, during the subsequent half rotation interval T2, the rotary head 1 scans the track A3. At this time, the azimuth of the rotary head 1 is matched with that of the track A3. The RF signal S2 having the predetermined level is produced. The RF signal S2 is supplied to the diode 5 to form the envelope signal of the RF signal S2. When the signal level of the envelope signal exceeds the signal referenced level, the level comparator 6 produces a pulse P2. The pulses P1 and P2 are transmitted via the drop-out compensator 9 to the microcomputer 10.

On the other hand, the RF switching signal, shown in FIG. 3(A), is transmitted to the edge detection circuit 12. A rotary pulse signal is formed, e.g., whenever the RF switching signal rises. The level of the RF switching signal is reversed whenever the drum has rotated through a half rotation. The rotary pulse signal derived by the edge detection circuit 12 is inputted to the microcomputer 10. In addition, the mode signal is supplied to the microcomputer 10 via the mode signal input terminal 13. The microcomputer 10 determines from the input mode signal that the tape speed is faster than the normal tape speed in the playback mode.

Since the microcomputer 10 receives pulses P1 and P2 ($b=2$) during the interval in which the rotary drum makes one rotation ($a=1$), the amount of tape run c (the number of frames) can be derived from such an equation as: $c = a + b = 1 + 2 = 3$. Since it takes 1/30 seconds for the rotary drum to make one rotation, the amount of tape through which the tape has run is converted to the series of time units expressed in hours, minutes, and seconds by multiplying the number of frames c derived as described above by 1/30 seconds.

The display unit 14 then displays the amount of tape which has run as calculated by the microcomputer 10. For example, in the triple speed reproduction mode where the tape speed is three times faster than the normal tape speed, the display unit 14 displays the amount of tape by which the tape has run in the series of units of hours, minutes, and seconds and increments the display contents by one second whenever the drum makes ten rotations. Thereafter, one pulse is derived from the drop-out compensator 9 whenever the rotary drum makes a half rotation and the amount of tape by which the tape has run is counted.

In addition, FIG. 4 shows scanning loci of the two rotary heads when the tape speed is in a four-times speed playback mode in the forward direction of the tape.

In the four-times tape speed mode, track A1, track A2, track A3, track A4, ., and track B1, track B2, track B3, track B4, . . . are alternately arranged on the tape. The tracks A1, A2, A3, A4, . . . are recorded with an A azimuth. The tracks B1, B2, B3, B4, . . . are recorded with B azimuth. The rotary leads 1 and 2 obliquely scan the recorded tracks as described above.

During the interval T1 of the half rotation of the drum corresponding to the RF switching signal shown in FIG. 5(A), the rotary head 2 scans the tracks A1, B1, A2, and B2 to draw the scanning locus H2 shown in FIG. 4.

The RF signal S11 is produced as shown in FIG. 5(B) when the rotary head 2 scans the track B1 during the interval T1. A pulse P11 is produced from the level comparator 6 as shown in FIG. 5(C) when the envelope signal of the RF signal S11 exceeds the reference signal level. When the rotary head 2 scans the track B2, the RF signal S12 is produced. When the envelope of the RF signal S12 exceeds the reference signal level, a pulse P12 is produced from the level comparator 6. During the subsequent interval T2, the rotary head 1 scans the track A3. At this time, the envelope of the RF signal exceeds the reference signal level. Hence, when the rotary head 2 scans track B2 and rotary head 1 scans the track A3, the RF signal S12 is continuously produced. A pulse P12 is produced as the output signal of the level comparator 6 when the envelope of the RF signal 12 exceeds the reference signal level.

Furthermore, when the rotary head 1 scans the track A4, the RF signal S13 is produced. When the envelope output of the RF signal S13 exceeds the reference signal level, a pulse P13 is produced from the level comparator 6.

Three pulses P11, P12, and P13 are produced from the level changes of the RF signals detected from the rotary heads 1 and 2 during one rotation of the rotary drum. These pulses are transmitted to the microcomputer 10 via the drop-out compensator 9. The number of pulses are counted. The edge detection circuit 12 detects the rising edge of the RF switching signal. The rotary pulse signal corresponding to the rising edge of the RF switching signal is transmitted to the microcomputer 10.

In addition, when the mode signal is transmitted to the microcomputer 10 via the mode signal input terminal 13, the microcomputer 10 determines that the tape speed is faster than the normal speed in the normal speed playback mode. Then, the microcomputer 10 selects a calculation equation of the number of frames c by which the tape has been scanned ($c = a + b$).

The microcomputer 10 calculates the number of frames c in such a way as $c = a + b = 1 + 3 = 4$ during the intervals (T1 + T2) since the pulses P11, P12, and P13 ($b = 3$) are produced during one rotation ($a = 1$) of the drum corresponding to the interval T1 plus the interval T2. The amount of tape by which the tape has run is converted into the series of time unit expressed by hours, minutes, and seconds. The microcomputer 10, at this time, multiplies the number of frames c derived in the way described above by 1/30 seconds since one rotation of the drum is 1/30 seconds. That is to say, $c \times (1/30) = 4/30$ seconds. In this way, 4/30 is counted as the amount by which the tape has run. Such a counting procedure as described above is carried out whenever the rotary drum makes one rotation. If such a state is continued, the display contents of the display unit 14 are incremented by four seconds, for example, for each of 30 rotations of the drum (during one second).

FIG. 6 shows the scanning loci of the rotary heads in a reverse mode, e.g., when the tape runs at the speed three times as fast as the normal tape speed in the direction opposite to the normal direction.

During the half rotation interval T1 of the drum, the rotary head 2 scans track A1, track B1, track A2, and track B2 to draw a scanning locus H2. During the subsequent half rotation interval T2 of the drum, the rotary head 1 scans track A2, track B2, track A3, and track B3 to draw a scanning locus H1.

During the interval T1 specified by the RF switching signal shown in FIG. 7(A), the azimuth of the rotary head 2 coincides with that of track B1 when the rotary head 2 scans the track B1. The RF signal S21 is produced as shown in FIG. 7(()). The pulse P21 is produced from the level comparator 6, as shown in FIG. 7(C). When the azimuth of the rotary head 1 coincides with that of the track A2 and the azimuth of the rotary head 2 coincides with that of the track B2, the RF signal S22 is produced. Consequently, a pulse P22 is produced from the level comparator 6. In addition, when the rotary head 1 scans the track A3, the azimuth of the rotary head 1 coincides with that of the track A3 and the RF signal S23 is produced. A pulse P23 is thus produced from the level comparator 6.

In the way described above, the pulses P21, P22, P23, . . . are produced since the level of the RF signal exceeds the predetermined level for each track having the azimuth with which that of either of the two rotary heads coincides. These pulses are supplied to the microcomputer 10 sequentially via the drop-out compensator 9.

In addition, with the mode signal supplied to the microcomputer 10 via the mode signal input terminal 13, the microcomputer 10 determines that the tape speed is slower than the normal tape speed in the normal playback mode with regard to the normal tape running direction i.e., faster than the normal tape speed in the reverse direction in the reverse playback mode. In this case, since the tape runs in the reverse direction and a pulse for one track is increased, the microcomputer 10 selects such an equation as $c = a - b$ as the calculation equation for the amount of tape by which the tape runs.

Since the pulses P21, P22, and P23 ($b = 3$) are produced during the interval of one rotation ($a = 1$) of the drum to which the interval T1 and interval T2 are added, the number of frames r by which the tape has run is counted as $c = 1 - 3 = -2$. Consequently, the tape has run two frames in the opposite direction during one rotation of the drum.

In this way, the number of frames, i.e., the amount of tape by which the tape has run is converted into the time unit and is displayed through the display unit 14 in the series of units; hours, minutes, and seconds.

In a still image playback mode, the counting operation of the number of pulses by means of the microcomputer 10 is stopped. At this time, the display of the amount of tape by which the tape has run is held at the same contents of display.

Although in the above-described preferred embodiment the amount of tape by which the tape has run, the tape being azimuth recorded, is displayed, it is also possible to display the amount of tape by which the tape has run by counting the number of times by which the rotary heads traverse guard bands from attenuations of the RF signal level, for such a tape on which each guard band is present between adjacent tracks.

According to the present invention, the pulse signal is produced when the level of the envelope signal derived through the detection of the RF signal changes. In addition, the number of rotations of the rotary heads are counted on the basis of the RF switching signal and the count value is corrected by the number of pulse signals depending on whether the tape speed is faster or slower than the normal tape speed.

Hence, the tape counter according to the present invention can detect the amount of tape by which the tape has run with a high accuracy and can display the amount of tape by which the tape has run in the series of units of the hour, minute, and second representation. Furthermore, the amount of tape by which the tape has run can be displayed in all playback modes through the change of the calculation equations through the use of which the amount of tape by which the tape has run is calculated according to the contents of playback mode.

What is claimed is:

1. A tape counter for counting an amount of tape by which a magnetic tape has run in a selected mode, selected by a mode selector means, other than the normal record mode or playback mode for a video signal recording and reproducing apparatus, wherein said tape is run in said selected mode at a different speed than a normal speed in said normal record or playback mode, said counter comprising:

(a) a rotary drum having a pair of rotary heads with an angular interval of 180 degrees for oblique azimuth recording on said tape during said normal record and playback modes, the magnetic tape being wound obliquely on said rotary drum through a wrap angle greater than 180 degrees, said rotary drum being rotated by drum rotation means at the same speed in each said mode, and said selected mode of said mode selector means involving moving said tape at a different speed in said selected mode than at a normal speed for said normal record or playback modes;
   (b) an envelope detector for detecting and producing an envelope of a reproduced Frequency Modulated (FM) signal derived from said rotary heads while said rotary heads scan respective parts of adjacent oblique tracks on said tape in said selected mode;
   (c) a pulse signal generator for generating a pulse signal according to a change in a level of the envelope produced by the envelope detector;
   (d) first means for counting the number of rotations per time of the rotary head on the basis of an RF switching signal derived by the video signal recording and reproducing apparatus;
   (e) second means for correcting a count value derived by the first means on the basis of the pulse signal generated by the pulse signal generator according to a tape speed in said selected mode with respect to said normal speed so that the amount of tape by which the magnetic tape during said selected mode has run is counted; and
   (f) wherein the selected mode available from said mode selector means includes modes with forward speeds three and four times faster than said normal speed, and a mode with a reverse speed three times faster than said normal speed.

2. The tape counter according to claim 1, wherein said second means is changed in that the normal tape speed in the playback mode is the same as that in a recording mode.

3. The tape counter according to claim 1, which further comprises third means for displaying the count value corrected by the second means in a series of units of hours, minutes and seconds.

4. The tape counter according to claim 3, wherein said third means includes means for displaying and holding the same contents of display when the tape is stopped in a still playback mode.

5. The tape counter according to claim 1, wherein the first means includes means for counting the number of rotations per time of the rotary head as 30 rotations per second.

6. The tape counter according to claim 5, wherein the second means includes means for multiplying a sum of one rotation of the rotary drum and the number of pulses in the pulse signal derived by the pulse signal generator during one rotation of the rotary drum by seconds per rotation of the drum when the tape speed is faster than the normal tape speed in the forward direction in the playback mode.

7. The tape counter according to claim 5, wherein the second means includes means for multiplying a difference between one rotation of the rotary drum and the number of pulses in the pulse signal derived by the pulse signal generator during one rotation of the rotary drum by seconds per rotate of the drum when the tape speed is faster than the normal tape speed in a reverse direction.

8. An apparatus for moving a recording tape in a lengthwise direction at normal and high speeds in respective normal and high-speed modes, said apparatus comprising:

a first means for producing in each of said high speed modes an envelope signal from signals recorded in tracks on said recording tape, each said track being obliquely oriented with respect to said lengthwise direction with overlap of successive ones of said tracks along said lengthwise direction, said first means includes means:
   (1) for scanning in each said high-speed mode along a respective locus across respective parts of a respective plurality of sequential ones of said tracks during each of a plurality of scans across said tape, for producing said envelope signal from the signals recorded on said respective parts of said tracks, and;
   2) for outputting during each said scan across each said plurality of segments said envelope signal;
   a predetermined value means for providing a predetermined value for use with said envelope signal;
   envelope detection means for comparing said envelope signal with said predetermined value, and for outputting a pulse each time said envelope signal exceeds said predetermined value;
   rotation pulse means for generating a rotation signal indicating each of a predetermined fraction of rotation of a rotating part of said apparatus, said rotating part rotating at the same speed and in the same direction in all of said modes;

means for comparing said pulses from said envelope detection means and said said rotation signal, and for providing an output corresponding to the length of said tape which has run, according to a respective predetermined calculation equation for each selected high-speed mode; and wherein said high-speed modes produced by said first means include two forward modes with tapes speeds three and four times said normal speed, respectively, and a reverse mode with tape speed three times said normal speed and in the opposite direction.

9. The apparatus of claim 8, wherein said first means includes a rotary drum with two recording heads spaced at 180 degrees for rotation to scan sequentially said successive segments, and wherein each said recording head defines a respective one of said locuses over a respective plurality of adjacent ones of said tracks during each said scan and is sensitive only to said signals in alternating ones of said tracks, each said recording head being sensitive to different alternating ones of said tracks, and said envelope signal being the interleaved output from the two recording heads.

10. The apparatus of claim 8, said rotating part being said rotary drum.

11. The apparatus of claim 8, further including means for providing a guard band between each adjacent pair of said oblique tracks on said tape.

12. A tape counter for counting an amount of tape by which a magnetic tape has run in a selected mode, selected by a mode selector means, other than the normal record or playback mode for a video signal recording and reproducing apparatus, wherein said tape is run in said selected mode at a different speed than a normal speed in said normal record or playback mode, said counter comprising:

(a) a rotary drum having a pair of rotary heads with an angular interval of 180 degrees for oblique azimuth recording on said tape during said normal record and playback modes, the magnetic tape being wound obliquely on said rotary drum through a wrap angle greater than 180 degrees, said rotary drum being rotated by drum rotation means at the same speed in each said mode, and said selected mode of said mode selector means involving moving said tape at a different speed in said selected mode than at a normal speed for said normal record or playback modes;

(b) an envelope detector for detecting and producing an envelope of a reproduced Frequency Modulated (FM) signal derived from said rotary heads while said rotary heads scan respective parts of adjacent oblique tracks on said tape in said selected mode;

(c) a pulse signal generator for generating a pulse signal according to a change in a level of the envelope produced by the envelope detector;

(d) first means for counting the number of rotations per time of the rotary head on the basis of an RF switching signal derived by the video signal recording and reproducing apparatus;

(e) second means for correcting a count value derived by the first means on the basis of the pulse signal generated by the pulse signal generator according to a tape speed in said selected mode with respect to said normal speed so that the amount of tape by which the magnetic tape during said selected mode has run is counted; and (f) a drop-out compensator for providing any missing pulses in said pulse signal as provided to said second means for said correcting of the count value.

13. An apparatus for moving a recording tape in a lengthwise direction at normal and high speeds in respective normal and high-speed modes, said apparatus comprising:

a first means for producing in each said high speed mode an envelope signal from signals recorded in tracks on said recording tape, each said track being obliquely oriented with respect to said lengthwise direction with overlap of successive ones of said tracks along said lengthwise direction, said first means including means;

1) for scanning in each of said high-speed modes along a respective locus across respective parts of a respective plurality of sequential ones of said tracks during each of a plurality of scans across said tape, for producing said envelope signal from the signals recorded on said respective parts of said tracks;

2) for outputting during each said scan across each said plurality of segments said envelope signal;

a reference mode means for providing a predetermined reference means for said reference signal;

a predetermined value means for providing a predetermined value for use with said envelope signal;

envelope detection means for comparing said envelope signal with said predetermined value, and for outputting a pulse each time said envelope signals exceeds a predetermined value;

rotation pulse means for generating a rotation signal indicating each of a predetermined fraction of rotation of a rotating part of said apparatus, said rotating part rotating at the same speed and in the same direction in all of said modes;

means for comparing said pulses from said envelope detection means and said rotation signal, and for providing an output corresponding to the length of said tape which has run, according to a respective predetermined calculation equation for each selected high-speed mode; and a drop-out compensator connected between the output of said envelope detection means and said means for comparison, for supplying an appropriate pulse at the appropriate time when such pulse is missing in the missing in the output from said envelope detection means.

14. An apparatus for moving a recording tape in a lengthwise direction at normal and high speeds in respective normal and high-speed modes which include two forward modes with tapes speeds three and four times said normal speed, respectively, and a reverse mode with tape speed three times said normal speed and in the opposite direction, said apparatus comprising:

a first means for producing in each said high speed mode an envelope signal from signals recorded in tracks on said recording tape, each said track being obliquely oriented with respect to said lengthwise direction with overlap of successive ones of said tracks along said lengthwise direction, said first means including means:

1) for scanning in each said high-speed mode along a respective locus across respective parts of a respective plurality of sequential ones of said tracks during each of a plurality of scans across said tape, for producing said envelope signal from the signals recorded on said respective parts of said tracks, and;

2) for outputting during each said scan across each said plurality of segments said envelope signal;

a predetermined value means for providing a predetermined reference value for said envelope signal;

envelope detection means for use with comparing said envelope signal with said predetermined value, and for outputting a pulse each time said envelope signal exceeds said predetermined value;

rotation pulse means for generating a rotation signal indicating each of a predetermined fraction of rotation of a rotating part of said apparatus, said rotating part rotating at the same speed and in the same direction in all of said modes;

means for comparing said pulses from said envelope detection means and said rotation signal, and for providing an output corresponding to the length of said tape which has run, according to a respective predetermined calculation equation for each selected high-speed mode, wherein said calculation equation for said two forward and said reverse modes is of the form $c=a+b$, with c corresponding to the amount of tape run in a rotation of said rotating part, a corresponding to the amount of tape run during a normal speed during one rotation of said rotating part, and b corresponding to a tape length increment in accordance with the number of said pulses output from said envelope detection means during one rotation of said rotating part, the value of b being negative for said reverse mode.

15. The apparatus of claim 14, wherein the values for a and b for said two forward and reverse modes are $a=1, 1, 1$ and $b=2, 3, -3$, respectively.

* * * * *